United States Patent [19]

Srinivasa et al.

[11] 4,276,493
[45] Jun. 30, 1981

[54] ATTACHMENT MEANS FOR A GRAPHITE X-RAY TUBE TARGET

[75] Inventors: Saroja R. Srinivasa, Milwaukee; Peter S. Shelley, Brookfield; Robert E. Hueschen, Hales Corners, all of Wis.

[73] Assignee: General Electric Company, Schenectady, N.Y.

[21] Appl. No.: 73,757

[22] Filed: Sep. 10, 1979

[51] Int. Cl.³ .............................................. H01J 35/08
[52] U.S. Cl. .................................... 313/330; 313/60; 403/87; 403/356; 403/335
[58] Field of Search ............... 313/55, 60, 58, 330; 403/87, 89, 101, 164, 272, 335, 352, 356, 404

[56] References Cited

U.S. PATENT DOCUMENTS

| 3,790,836 | 2/1974 | Braun | 313/60 |
| 3,900,751 | 8/1975 | Holland et al. | 313/330 |

FOREIGN PATENT DOCUMENTS

| 2425082 | 11/1975 | Fed. Rep. of Germany | 313/60 |
| 515911 | 12/1920 | France | 403/356 |

*Primary Examiner*—Saxfield Chatmon, Jr.
*Attorney, Agent, or Firm*—Wheeler, House, Fuller & Hohenfeldt

[57] ABSTRACT

A graphite target disk for a rotating anode x-ray tube is adapted for mounting it on a rotor stem in a manner which reduces the probability of the target cracking when it is subjected to high magnitude thermal and rotational shocks. The graphite disk has a counterbore in its front and rear faces which are connected with a smaller central bore so the counterbores define annular shoulders. A washer having a slot which serves as a keyway is brazed concentrically onto the shoulder of the front counterbore. The rotor stem has a threaded end which registers complementarily in the slot to effect a driving connection and the stem has a radially extending shoulder which interfaces with the shoulder in the rear counterbore. A nut on the threaded stem end secures the target to the stem.

15 Claims, 6 Drawing Figures

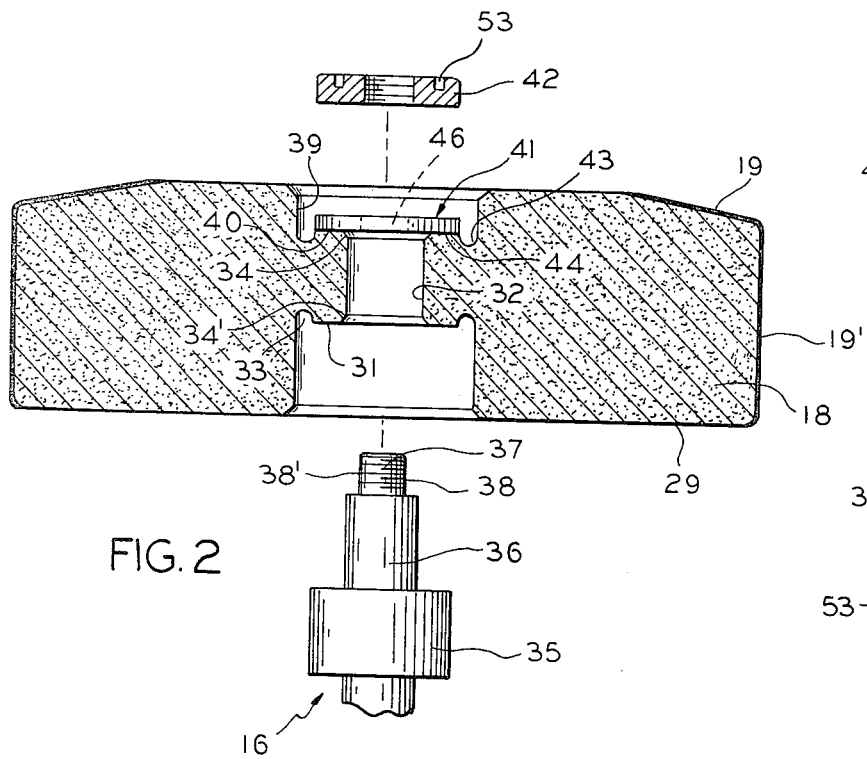
FIG. 2
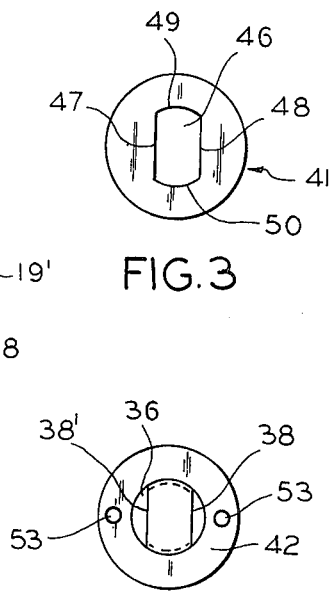
FIG. 3
FIG. 4
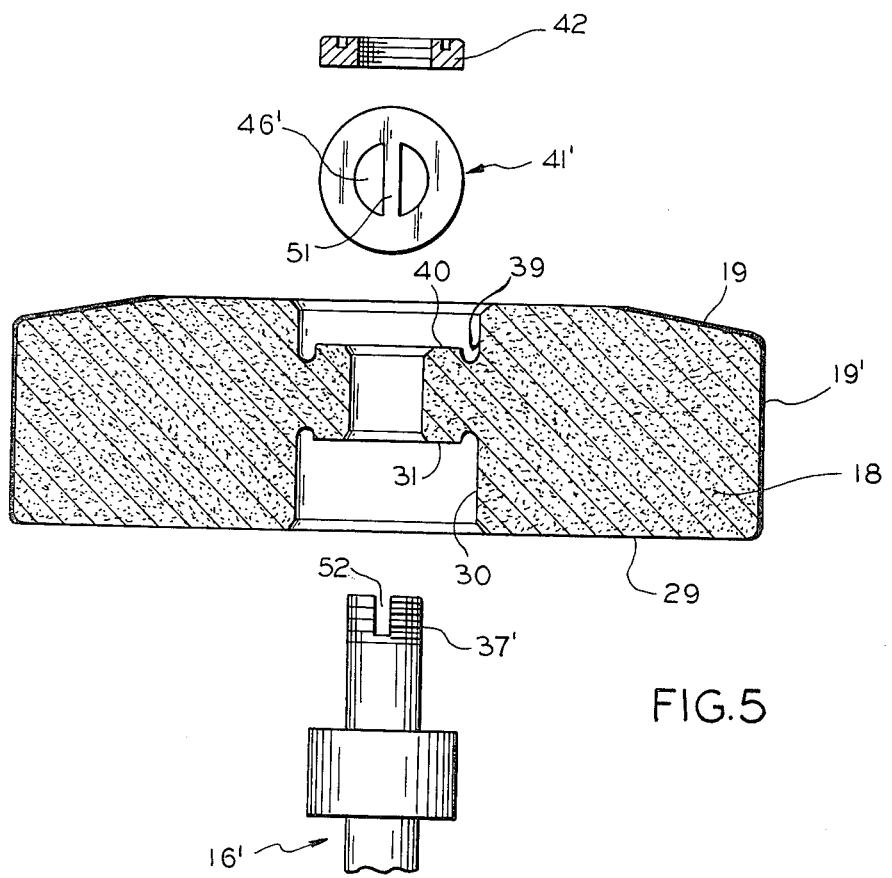
FIG. 5

ATTACHMENT MEANS FOR A GRAPHITE X-RAY TUBE TARGET

This disclosure pertains to attaching a graphite target to the stem of the rotor in a rotating anode x-ray tube.

X-ray tube targets composed principally of graphite have several advantages over targets made of refractory metals such as tungsten and molybdenum. Graphite has lower mass and can be accelerated, for example, from zero to 10,000 rpm in as little as one-third of the time that it takes a metal target of equal thermal capacity to be accelerated through this speed range. Graphite, when properly mounted, has good resistance to thermal shock. It has high heat storage capacity compared to the common refractory metals and its thermal emissivity is almost as good as that of a theoretical black body. Despite the apparent advantages of graphite targets, they have not been widely used in x-ray tubes because they also create some problems.

One of the problems is that graphite target bodies loosen on the stem of the anode rotor after being subjected to the numerous acceleration and deceleration and thermal cycles which an x-ray tube undergoes during its expected lifetime. The causes of this problem may be appreciated if one considers the requisite target operating parameters. A typical four-inch or five-inch diameter graphite target must be capable of tolerating acceleration from zero to 10,000 rpm in two seconds and it must be capable of being stopped in even less time. The torque on the anode due to rotational cycling is typically about 15 inch-pounds. During normal operation, a graphite target may change from room temperature to as high as 1550° C. in about five or ten seconds depending upon the x-ray exposure technique being used. These high amplitude thermal cycles accentuate the undesirable consequences of any thermal expansion mismatch between the graphite target body and the metal of the x-ray tube rotor stem to which the target is attached. High temperatures also lower the yield strength of the stem and any component that is used to fasten the target to the stem. Moreover, temperatures high enough to exceed the elastic limit of the materials may occur, giving rise to a phenomena known as thermal creep.

Graphite is also vulnerable to cracking and fracturing unless its thermally created internal stresses are properly relieved. Any sharp notch in graphite is likely to become the origin of a crack. Previously used procedures for fastening graphite targets to rotor stems have resulted in development of high internal stresses under thermal and rotational cycling which, although not evident in the early life of the tube, ultimately lead to failure of the target. For instance, simple threaded fasteners for preventing target rotation on the stem require use of detents, protuberances such as dimples and recesses which result in high stress regions that become fracture sites. Loosening of the target can also result in loss of balance and consequent disintegration at high rotational speeds. Besides, if the target slips or turns on its stem instead of with its stem, the focal spot track will be rotating slower than is necessary for dissipating the intense heat which develops at the focal spot, and radially extending melt lines, called slash melts, will occur in the focal track. Mounting a target on an anode stem in a manner which will result in internal stresses being minimized and in the target not loosening during the life of the x-ray tube has been a long sought goal.

SUMMARY OF THE INVENTION

An object of the present invention is to overcome the above-noted problems by providing a new technique for preparing a graphite-based target to be mounted on the rotor stem of a rotating anode x-ray tube such that the target will not fracture or loosen during a reasonable lifetime of the x-ray tube.

Other more specific objects are to attach a graphite target in a manner that avoids loss of balance and slash melting and that provides for transmitting stresses to the graphite and for dissipating stresses safely.

Briefly stated, in accordance with the invention, a graphite target disk is formed with central counterbores in its front and rear faces and a bore connecting the counterbores. The bore accommodates the stem of the x-ray tube rotor. The rotor stem has a cylindrical portion with a radially extending shoulder that seats on the shoulder of the rear counterbore. The counterbores are configured for obtaining maximum internal stress relief. A slot washer is brazed to the graphite disk concentrically with the stem bore and the threaded end of the stem is shaped complementarily to the slot to effect a driving connection whereby the rotational force or torque delivered from the rotating stem for driving the target rotationally is applied through the washer. A nut engages the threaded end of the stem for holding the target on it. Particular combinations of materials for the washer, braze, nut and stem are disclosed for obtaining thermal and physical compatibility of the parts which comprise the anode assembly.

How the aforementioned general object and other more specific objects of the invention are achieved will be evident in the ensuing more detailed description of illustrative embodiments of the invention which will now be set forth in reference to the drawings.

DESCRIPTION OF THE DRAWINGS

FIG. 2 is an exploded view of a grapite target, prepared in accordance with the invention, in conjunction with a fragment of a rotor stem and a clamping nut, the target body and clamping nut being shown in section;

FIG. 3 is a plan view of a slot washer shown isolated from the FIG. 2 embodiment, this washer having the same outside diameter as a foil wafer which is used to braze the washer to the graphite target body;

FIG. 4 is a plan view of the washer depicted in FIG. 3 and showing its relationship to the specially configured threaded end of the x-ray tube rotor stem;

FIG. 5 shows a graphite-based target in section in conjunction with a washer, which differs from that shown in FIG. 3, and with a clamping nut and a rotor stem that is specially configured for cooperating with the washer.

DESCRIPTION OF A PREFERRED EMBODIMENT

Figure 1:
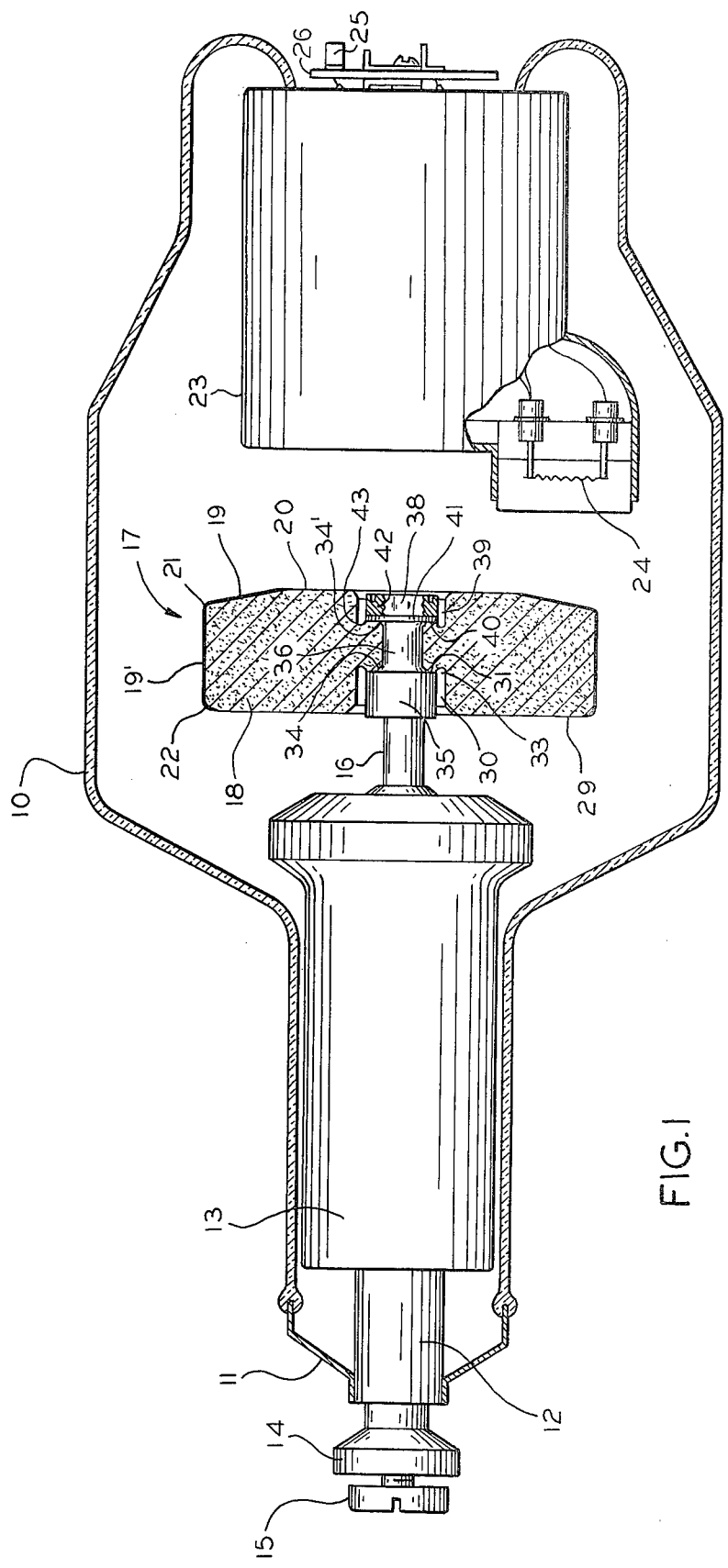
FIG. 1 depicts a typical x-ray tube, partly in section, in which a graphite target incorporating the new attachment means is used.

FIG. 1 shows a typical rotating anode x-ray tube in which a graphite target that is attached by the new method and means to be described herein may be used. The illustrative x-ray tube comprises a glass envelope 10 which has a ferrule 11 sealed in one end. The ferrule supports a shaft 12 on which a cylindrical sleeve 13, which is actually the rotor of an induction motor, is journaled for rotation. The motor field coils are not shown. A connector 14 extends from shaft 12 and there is a screw 15 in the connector for mounting the tube and for attaching a high voltage lead to the rotor assembly.

An anode target supporting stem, generally designated by the numeral 16, projects coaxially from rotor 13. In this tube, a graphite based target 17 is supported on stem 16 and the target is attached to the stem by the method and means which constitute the present invention.

Target 17 comprises a graphite body or substrate 18 which is shown in section. A metallic focal track 19, on which an electron beam impinges to produce x-rays, is bonded to the beveled circular margin of the front face 20 of the graphite substrate. The focal track material may be continued along the periphery of the target body as shown and indicated by numeral 19'. The focal track is preferably comprised of an alloy of tungsten and rhenium. Typically, the alloy comprises 90% to 97% tungsten and 3% to 10% rhenium, respectively. The edges 21 and 22 of the graphite traget are rounded to minimize the electric field intensity which might otherwise cause high voltage breakdown of the tube and to enhance adhesion of the focal track material to the graphite substrate.

The x-ray tube also includes a cylindrical cathode mounting 23 which contains the cathode filament 24 from which a focused beam of electrons is projected to the focal track coating or layer 19 for producing x-radiation. Electrical connections to the filament are made by means of spade connectors 25 mounted on an insulating board 26.

It should be noted in FIG. 1 that nothing protrudes from the front face 20 of the composite target so there are no high field intensity points which would increase the likelihood of a short circuiting electrical discharge between the target structure and cathode mounting cylinder 23.

Referring to FIG. 1, the manner in which composite graphite-based target 17 is attached to the rotary anode stem 16 is the main feature of the invention. The elements of the attachment will be generally identified in connection with FIG. 1 and the details of the manner in which the elements are constructed, processed and arranged will be discussed later. FIG. 1 shows that the rear face 29 of the graphite target disk 18 is provided with a counterbore 30 which terminates in a bearing surface or shoulder 31. A central hole 32 extends axially from counterbore 30. A shallow annular groove 33 surrounds the shoulder 31. The groove has an appoximately semicircular cross section. Groove 33 is also for the purpose of relieving stress which would otherwise concentrate in this region if shoulder 31 joined the wall of counterbore 30 at a sharp right angle. In other words, groove 33 obviates the notch effect. Central hole 32 is preferably chamfered as indicated by the reference numeral 34 to eliminate any sharp edges which might otherwise cause concentrated internal stresses to be developed at the corners. Rotor stem 16 has an integral enlarged cylindrical portion 35 which provides a radial shoulder. The outside diameter of cylindrical portion 35 is less than the inside diameter of bore 30 as is evident from inspection of the drawing. One axial end face or shoulder of enlarged cylindrical portion 35 of the stem interfaces squarely with radially extending shoulder 31 in the rear face counterbore 30 of the target body. A reduced diameter stem portion 36 extends integrally from cylindrical portion 35 and it has a thread 37 on its end which, in this embodiment, has flat unthreaded and parallel sides such as the one marked 38. The flattened and threaded end of the stem extends into a counterbore 39 in the front face 20 of the graphite substrate. Counterbore 39 terminates in a radially projecting shoulder 40. Washer 41 is provided with a slot which serves the purpose of a keyway and is complementary to the shape of the threaded end of the rotor stem. Washer 41 is brazed to the shoulder 40 in accordance with the invention, as will be discussed in greater detail later. A nut 42 turns onto thread 37 of the rotor stem and develops compressive force only on the washer and graphite below the washer for clamping the graphite body to the stem 16. Shoulder 40 is surrounded by a stress relief groove 43 which performs the same function as the previously discussed groove 33. Both grooves 33 and 43 must have the same diameter to obtain optimum stress relief and shoulders 31 and 40 must have the same size. Nut 42 is round and preferably has a diameter identical with the diameter of washer 41. The interface between cylindrical portion 35 of the rotor stem and shoulder 31 in the rear face counterbore is also exclusively compressive. The design avoids stressing the graphite transversely or in tension as graphite is most vulnerable to cracking when subjected to stresses of this kind.

Specific features of the new target attachment will now be described in greater detail in reference to the FIG. 2 embodiment.

First of all it should be recognized that the thermal expansion properties and the moduli of compression and tension of the graphite used by particular manufacturers may differ but in any case the graphite will presumably be the best available for target use. The thermal coefficient of expansion of the graphite should be matched as near as possible with that of the anode focal track material 19 which will usually be a tungsten-rhenium alloy because of it being noted for its good x-ray producing efficiency and metallurgical properties. In a long life graphite target x-ray tube developed by applicants and using the target attachment features described below, for example, a 90% tungsten and 10% rhenium alloy is used for the focal track 19 and it is deposited on the graphite substrate 18 by a chemical vapor deposit technique from rhenium and tungsten hexafluorides. Most, if not all, graphites used for targets have a lower thermal coefficient of expansion than metals such as molybdenum-based alloys used for target supporting stems and this makes the problem of keeping the target tight on the stem more difficult.

Referring to FIG. 2, a slot washer 41 is brazed to the shoulder 40 in counterbore 39 on the front face of the graphite body as mentioned earlier. In FIG. 2 the thin layer of brazing material is at the interface between washer 41 and shoulder 40 and the material is marked 44. Before being raised to brazing temperature the thin foil wafer used for making the braze has substantially the same outside diameter as the washer 41 shown in FIG. 3 but it has a full size round hole. In other words, the foil wafer conforms in size and shape to shoulder 44. Brazing foils having a thickness of about 0.004 inch have been found desirable for the foil materials described hereafter. Further properties of the brazing material and washers, graphite bodies, nuts and rotor stems with which they are compatible will be discussed later. Slot washers 41 are preferably about 0.040 inch to 0.060 inch thick. They are cut from sheet stock by electrodischarge machining because they are made of refractory materials which are not amenable to traditional stamping or machining methods.

The washer 41 for the FIG. 2 embodiment of the target attachment is depicted in isolation in FIG. 3. In this example, washer 41 has a hole or slot 46 bounded by straight parallel sides 47 and 48 and curved sides 49 and 50 which are segments of a circle in this design. The flat sides 38 and 38' of the threaded end of rotor stem 38 in FIG. 2 are spaced apart by a distance substantially equal to the space between sides 47 and 48 of the washer slot so the threaded stem end will fit through slot 46 snuggly. A tolerance of about 0.001 inch is allowed in an actual embodiment. It will be evident that elongated slot 46 in the washer serves as a keyway and the complementarily shaped end of the rotor stem acts as a driving key after the stem is inserted in the washer as shown in FIG. 1.

A view of the target retaining nut 42 turned onto the threads 37 of the rotor stem is shown in FIG. 4. As can be seen in FIG. 4 and FIG. 2 as well, nut 42 is provided with holes 53 which are engageable with the pins of a spanner wrench for turning the nut tightly onto threads 37. Referring to FIGS. 1 and 2, the unthreaded cylindrical portion 36 of rotor stem 16 is sized to fit through central hole 32 in target body 18 preferably with minor clearance so that radial stresses due to thermal cycling will not develop in this region and so all forces developed by tightening nut 42 on thread 37 will be compressive.

The annular stress relief grooves 33 and 43 in the target body surrounding shoulders 31 and 40, respectively, are important. Sharp corners between the walls of the counterbores 30 and 39 and the radially extending shoulders 31 and 40, respectively, would result in high internal stress zones which could lead to graphite fracture. The diameter of washer 41 is preferably equal to the diameter of shoulder 40 but the washer diameter could be large enough to overhang shoulder 40 and extend into stress relief groove 43. However, the diameter of washer 41 should not be less than the inside diameter of the stress relief groove because this would vitiate the benefits of having the stress relief groove. Cylindrical portion 35 of the stem also has a lesser diameter than the rear counterbore 30 so the cylindrical portion fits through the counterbore with substantial clearance around it. Again, it is preferable that the outside diameter of cylindrical portion 35 shoulder be equal to the inside diameter of the stress relief groove 33 although some overhang of the cylinder 35 shoulder beyond the graphite shoulder 31 is permissible for reasons just explained in reference to washer 41.

Another embodiment of the target attachment is depicted in FIG. 5. In this embodiment, the target body 18 has counterbores 30 and 39 and shoulders 31 and 40, respectively, which may be the same as in the FIG. 2 embodiment of the target. In the FIG. 5 embodiment, the washer 41' which provides the driving slot or keyway when it is brazed into counterbore 39 has a somewhat different configuration than washer 41 in FIGS. 2-4. In the FIG. 5 embodiment, washer 41' is electrodischarge machined in a fashion which results in a circular hole 46' across which a web 51 is allowed to remain. The end of the rotor stem 16' is round and has a thread 37' on it. The threaded end of the stem has a slot 52 in it. The width of the end slot 52 is substantially equal to the width of web 51 so that the web will fit into the slot 52 when the stem is pushed into the target on which washer 41' is brazed. In other words, web 51 now serves as the key and slot 52 in the stem serves as key slot for effecting positive driving engagement between the stem and the graphite target body 18 to which washer 41' is brazed.

In accordance with the invention, rotor stem 16 is preferably made of a carbon-deoxidized molybdenum-based alloy formed with the vacuum arc casting process. The alloy used is known in the trade as TZM and is available from several manufacturers of alloys. TZM is composed of no less than 99.25% of molybdenum up to 99.4%, 0.4 to 0.55% titanium and about 0.06 to 0.12% of zirconium. The remainder of about 0.3% is made up of controlled impurities such as carbon, iron, nickel, silicon, oxygen, hydrogen and nitrogen. TZM has good high temperature strength and thermal conductivity.

Figure 6:
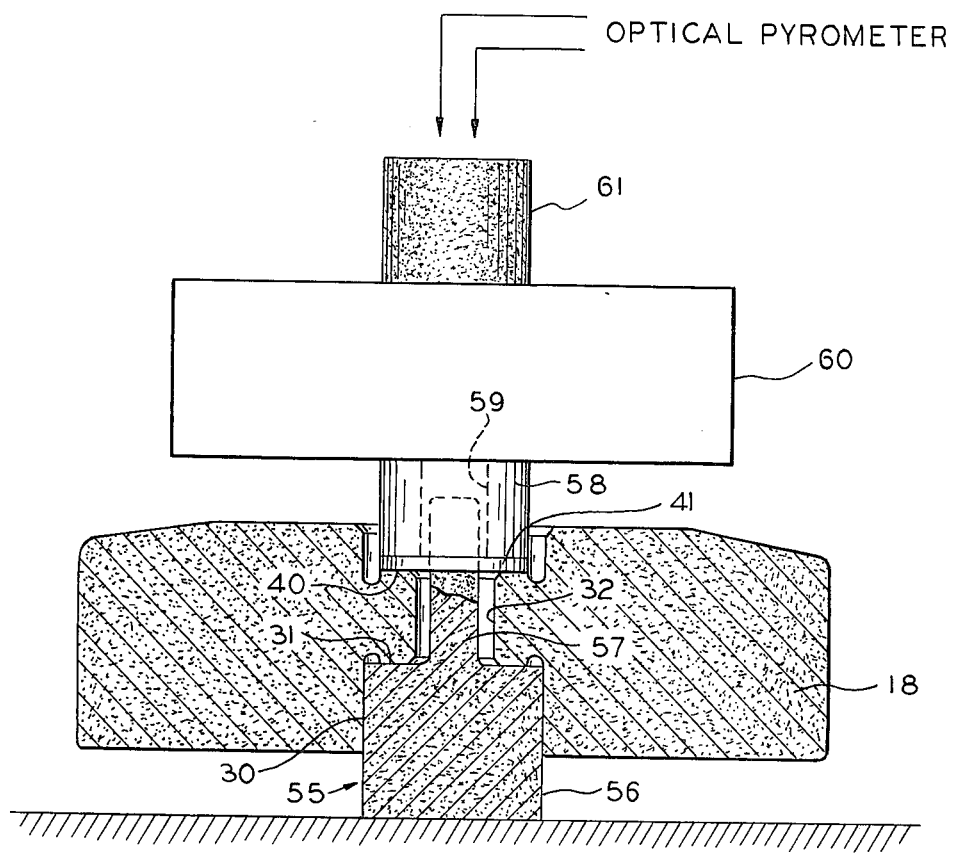
FIG. 6 is a diagram of some of the parts involved in brazing the washer into a graphite target body.

The slot washers 41 are brazed onto the graphite target body 18 with the equipment that is shown schematically in FIG. 6. Brazing is done in an electric induction furnace having a vacuum ambient. The tungsten-rhenium focal track layer 19 is deposited after the washer 41 is brazed to the graphite target body so focal track layer 19 is not as yet present in the FIG. 6 brazing operation. For the brazing operation, graphite target body 18 is supported on a graphite brazing alignment fixture or pilot stem 55 having a cylindrical base 56 whose outside diameter is substantially equal and concentric to the inside diameter of graphite target bore 30. The flat shoulder 31 of the graphite target rests squarely on the top of cylindrical base 56. A graphite shank 57 extends integrally from the alignment fixture base 56 and has a cross sectional shape which is complementary to the slot 46 in washer 41. This arrangement keeps the washer 41 coaxial with the target body 18 during brazing.

Before washer 41 is deposited on shank 57 of the alignment fixture 55, a thin foil of brazing material is placed at the interface between the bottom of washer 41 and flat shoulder 40 on the target body. Generally, brazing foils having a thickness of about 0.004 inch are used. Significantly thicker foils might result in brazed metal flowing beyond the interface of the washer and shoulder, or even into the keyway slot which is undesirable. Pressure is maintained on washer 41, while it is being heated to cause the braze metal foil to fuse, with a cylindrical spacer 58 made of TZM, preferably. Spacer 58 has a bore 59 into which shank 57 of the graphite brazing alignment fixture projects. A heavy weight, such as a piece of tungsten 60, is placed on spacer 58 to augment the pressure on washer 41 and assure that the washer will remain level when the brazing foil has fused as a result of being heated to near its melting temperature. A graphite stub or cylinder 61 is placed on weight 60 for being viewed by an optical pyrometer, not shown, but indicated by a legend which provides a basis for controlling the temperature within the evacuated furnace during the brazing operation. Generally it takes five to ten minutes of heating the whole mass at near the melting temperature of the braze foil to assure that the braze foil has fused evenly and effected a good bond between the washer 41 and the graphite target body shoulder 40. When the washer has been brazed and the target has cooled, the target is ready for deposition of the focal track layer 19 and its axial extension 19'.

It will be evident that the shank 57 of the graphite brazing fixture will always have to be shaped complementarily to the shape of the slot in the washer. For instance, if a washer 41' with a web across its hole 46, as in FIG. 5, is used, the shank would have a shape corresponding with the threaded and slotted end of the rotor stem 16' in FIG. 5.

After the focal track layer 19 has been deposited, the target is desirably vacuum fired at about 1500° C. for one hour and then stored in dried nitrogen in readiness for assembly into an x-ray tube.

As indicated earlier, all of the materials used in the graphite-based target must be compatible insofar as their thermal coefficients of expansion and reactivity are concerned. Graphites used by different x-ray tube manufacturers may have different expansion and strength characteristics. The composition of the focal track 19 may vary between manufacturers. Generally, an alloy comprised of tungsten with 3% to 10% of rhenium is used for the focal track. It may be noted that a thin barrier layer of pure rhenium may be deposited advantageously on the target substrate before the tungsten-rhenium alloy layer 19 is deposited. The pure rhenium barrier layer inhibits undesirable tungsten carbide formation in the focal track. Tungsten carbide melts at 2420° C. which is too far below the maximum temperature of about 3100° C. developed under the focal track layer 19 during x-ray tube operation. Melting of tungsten carbide could permit the focal track to peel off and result in high temperature target failure. The washer 41 and braze foil materials must also be compatible in the system. Various combinations of materials which resulted in durable targets will now be given.

A combination found to be useable with any type of graphite that is currently used for target bodies 18 consists of using pure tungsten or tungsten with 10% rhenium or pure molybdenum for the illustrated washers 41 or 41' and a brazing foil 44 consisting of zirconium. It is preferable for the composition of the washer 41 to be the same as the focal track layer 19 to reduce the likelihood of unequal thermal stress characteristics developing when the target gets very hot during tube operation. Brazing is carried out at a furnace temperature range between 1600° C. and 1700° C. Uniform, gap-free flow of the brazing foil material is obtained. The braze joints between the washer and graphite target body were found to be capable of withstanding at least 300 inch-pounds of torque before failure and this is far in excess of the 15 inch-pounds of torque which might occur under expected target accelerating and decelerating conditions in an operating x-ray tube. A vacuum of $10^{-6}$ Torr is maintained in the furnace during brazing.

High integrity brazes were also obtained using tungsten, tungsten and 10% rhenium alloy, or molybdenum for washer 41 and using platinum for the brazing foil. These combinations of washer and brazing foil materials were suitable for any of the graphites commonly used in x-ray tube targets. Where platinum is used as the brazing foil, the temperature at which brazing is conducted should be in the range of 1700° C. to 1750° C. The high cost of platinum foil, of course, makes it a secondary choice to using zirconium.

Another combination found to produce good brazes uses tungsten or tungsten-10% rhenium alloy or pure molybdenum as a material for washer 41 and titanium for the brazing foil 44. Satisfactory brazes were obtained with this combination. Brazing is conducted at temperatures ranging between 1625° C. and 1675° C.

Another combination used tungsten or tungsten-10% rhenium alloy for washer 41 and nickel for the brazing foil. An advantage of this combination is that brazing can be conducted at temperatures a little over 1425° C. However, the vapor pressure of nickel is relatively high and could limit the maximum operating temperature of high thermal rating x-ray tubes where the target may be expected to reach a maximum bulk temperature of 1550° C. This combination might be useable in relatively low energy x-ray tubes.

Another combination used molybdenum as the washer 41 material and nickel for the brazing foil. Brazing could be conducted at only 1300° C., which is advantageous, although the higher vapor pressure of nickel compared to zirconium would still be a disadvantage as indicated in the preceding paragraph.

Using vanadium for the brazing foil and either tungsten or tungsten-10% rhenium alloy or molybdenum for the washer 41 was tried and considered to be less desirable than any of the combinations mentioned above. When tungsten or tungsten-10% rhenium was used for the washer, a very high temperature of over 1900° C. was required for producing a sound braze. Molybdenum as a washer material in combination with a vanadium foil could be brazed at a reasonable temperature of about a little over 1625° C. but was found to produce vanadium carbides at the interface of the graphite and brazing material which was predicted to result in a relatively weak braze joint.

The nuts 42 used for securing any of the composite targets, just described, to the rotor stem should be made of molybdenum or TZM.

In summary, when all factors are considered, use of either tungsten, tungsten with up to 10% rhenium or molybdenum for washer 41 and zirconium for the brazing foil should be considered the preferred embodiment. Zirconium has high wettability relative to the graphite target substrate and to the washer which is evidenced by a very strong braze joint being produced which remains strong when the target is at the highest expected bulk temperature. Zirconium also forms some zirconium carbide, for instance, a layer of only about one or two microns thick. The amount of carbide formed with the zirconium brazing foil is desirably less than with the other materials excepting platinum.

By using the brazing techniques set forth above and by shaping the graphite body 18 with opposing counterbores having stress relief grooves surrounding them as described in detail above, and mounting the targets on a molybdenum-based alloy such as TZM, target attachments are achieved which withstand high amplitude acceleration, deceleration and thermal cycling and result in graphite target x-ray tubes having a longer life span than any graphite target tubes of which applicants have become aware.

We claim:

1. A composite x-ray target composed primarily of graphite adapted for being attached to the rotor stem of a rotating anode x-ray tube, said target comprising a disk-shaped graphite body having a central axial bore and axially spaced apart radially extending first and second shoulders formed in said body around respectively opposite ends of said bore, metal washer means having opposed faces, one of which faces is brazed to said first shoulder, said washer means having slot means, said stem being insertable in said body and comprising a cylindrical portion for extending through said bore of said body and a first shoulder on said portion to abut against said one face of the washer and having a threaded end portion for extending through said slot means said threaded end portion having a cross sectional shape other than a full circle and being shaped complementarily to said slot means for effecting a positive driving relationship therewith, said stem also having a second radially extending shoulder axially spaced from said first shoulder for abutting against said second shoulder of said body, and a nut member for turning onto said threaded end of the stem and against said washer means for clamping said target compressively to said stem.

2. The target as in claim 1 including annular stress relief grooves in said body concentric with said bore, said grooves having a rounded bottom, the inside diameter of one groove defining the outside diameter of said first shoulder and the inside diameter of the other groove defining the outside diameter of said second shoulder, said grooves having the same diameters.

3. The target as in claim 2 wherein the outside diameter of said washer is at least equal to the inside diameter of the groove which defines said first shoulder.

4. The target as in claim 1 wherein said disk-shaped graphite body has opposed generally radially extending front and rear surfaces and a metallic focal track layer bonded to said front surface, said front surface having a first counterbore extending axially to said bore, said counterbore having an annular stress relief groove in its bottom concentric with said counterbore with an outside diameter equal to the inside diameter of said counterbore and with an inside diameter defining the outside diameter of said first shoulder, said rear surface of the body having a second counterbore extending axially to said bore, said second counterbore having an annular stress relief groove in its bottom concentric with said second counterbore with an outside diameter equal to the outside diameter of said second counterbore and with an inside diameter defining the outside diameter of said second shoulder, said stress relief grooves having equal diameters.

5. The target as in claim 1 wherein said slot means in said washer is elongated and defined by a pair of spaced apart straight edges in one direction and an arcuate pair of edges in the other direction, said threaded end of said stem having flat unthreaded faces spaced apart by an amount substantially equal to the distance between said straight edges and having arcuate threaded peripheries complementary in shape and size to said arcuate edges of the washer opening.

6. The target as in claim 1 wherein said slot means in said washer is circular and has a web extending diametrically across it, and said threaded end portion of said stem has an axially extending diametrically disposed slot therein for engaging with said web.

7. The target attachment as in any of claims 1, 2, 3, 4, 5 or 6 wherein:

said washer is composed of a metal selected from the group consisting of tungsten, an alloy having tungsten as a major constituent and rhenium as a minor constituent, and molybdenum, and brazing of said washer to said first shoulder being accomplished by interposing a metal foil between said washer and first shoulder and heating said body to at least a temperature that will effect a braze, said foil being composed of platinum.

8. The target attachment as in claim 7 wherein said stem is composed of TZM alloy and said nut member is composed of a metal selected from the group consisting of TZM alloy and molybdenum.

9. The target attachment as in any of claims 1, 2, 3, 4, 5, 6 or 8 wherein:

said washer is composed of a metal selected from the group consisting of tungsten, an alloy having tungsten as a major constituent and rhenium as a minor constituent, and molybdenum, brazing of said washer to said first shoulder being accomplished by interposing a metal foil between said washer and first shoulder and heating said body to at least a temperature that will effect a braze, said foil being composed of zirconium.

10. The target attachment as in claim 9 wherein said stem is composed of TZM alloy and said nut member is composed of a metal selected from the group consisting of TZM alloy and molybdenum.

11. The target attachment as in any of claims 1, 2, 3, 4, 5, 6 or 8 wherein:

said washer is composed of a metal selected from the group consisting of tungsten, an alloy having tungsten as a major constituent and rhenium as a minor constituent, and molybdenum, brazing of said washer to said first shoulder being accomplished by interposing a metal foil between said washer and first shoulder and heating said body to at least a temperature that will effect a braze, said foil being composed of nickel.

12. The target attachment as in claim 11 wherein said stem is composed of TZM alloy and said nut member is composed of a metal selected from the group consisting of TZM alloy and molybdenum.

13. A composite x-ray target composed primarily of graphite adapted for being attached to the rotor stem of a rotating anode x-ray tube, said target comprising a disk-shaped graphite body having a front face and rear face and a circular periphery, a circular layer of a tungsten-rhenium alloy bonded to said front face for a beam of electrons to impinge on and produce x-radiation, said graphite body having an axially extending central bore and said front and rear faces each having a counterbore coaxial with and extending to said bore for the bottoms of said counterbores to define radially extending and axially spaced apart circular first and second graphite shoulders, respectively, at opposite ends of said bore, the bottom of said counterbores, respectively, having an annular stress relief groove whose outside diameters equal the inside diameter of the counterbore and whose inside diameters define the outside diameter of said circular shoulders, the diameters of said stress relief grooves being equal, circular washer means brazed on said shoulder in the counterbore in said front face, said washer means having an outside diameter at least equal to the outside diameter of said graphite shoulder, and a thin layer of brazing metal disposed between said washer and shoulder for bonding them together, said washer having slot means aligned with said bore, said stem comprising a first cylindrical portion providing a shoulder for abutting the shoulder in said rear face counterbore, a second cylindrical portion extending axially from said first cylindrical portion and providing a shoulder for abutting said washer and a portion having an externally threaded end portion which has a cross sectional shape other than fully circular and extending from said second cylindrical portion and said cross sectional shape of the threaded end portion being complementary to the shape of said slot means in said washer for making positive driving engagement therewith, and a nut member for being turned onto threaded end portion of said stem and against said washer for clamping said target compressively to said rotor stem.

14. The target attachment as in claim 13 wherein:
said washer is composed of a metal selected from the group consisting of tungsten, an alloy composed of 90% to 97% tungsten and the remainder of rhenium and molybdenum,
said brazing material being composed of platinum, and
said circular layer on said front face of said graphite body being composed of 90% to 97% tungsten and the remainder of rhenium,
said rotor stem being composed of TZM alloy, and
said nut member being composed of a metal selected from the group consisting of TZM alloy and molybdenum.

15. The target attachment as in claim 13 wherein:
said washer is composed of a metal selected from the group consisting of tungsten, an alloy composed of 90% to 97% tungsten and the remainder of rhenium and molybdenum,
said brazing material being composed of zirconium, and
said circular layer on said front face of said graphite body being composed of 90% to 97% tungsten and the remainder of rhenium,
said rotor stem being composed of TZM, and
said nut member being composed of a metal selected from the group consisting of TZM alloy and molybdenum.

* * * * *